(12) United States Patent
Tytgat et al.

(10) Patent No.: US 9,324,191 B2
(45) Date of Patent: *Apr. 26, 2016

(54) METHOD AND ARRANGEMENT FOR IMAGE MODEL CONSTRUCTION

(75) Inventors: Donny Tytgat, Antwerp (BE); Erwin Six, Antwerp (BE); Sammy Lievens, Antwerp (BE); Maarten Aerts, Antwerp (BE)

(73) Assignee: Alcatel Lucent, Boulogne-Billancourt (FR)

( * ) Notice: Subject to any disclaimer, the term of this patent is extended or adjusted under 35 U.S.C. 154(b) by 149 days.

This patent is subject to a terminal disclaimer.

(21) Appl. No.: 14/122,143

(22) PCT Filed: Jun. 4, 2012

(86) PCT No.: PCT/EP2012/060507
§ 371 (c)(1),
(2), (4) Date: Mar. 5, 2014

(87) PCT Pub. No.: WO2012/175320
PCT Pub. Date: Dec. 27, 2012

(65) Prior Publication Data
US 2014/0212030 A1    Jul. 31, 2014

(30) Foreign Application Priority Data

Jun. 20, 2011 (EP) .................................. 11305768

(51) Int. Cl.
G06K 9/00 (2006.01)
G06T 19/20 (2011.01)
G06T 7/20 (2006.01)

(52) U.S. Cl.
CPC .............. *G06T 19/20* (2013.01); *G06T 7/2046* (2013.01); *G06T 2207/10016* (2013.01); *G06T 2207/20121* (2013.01); *G06T 2207/30201* (2013.01)

(58) Field of Classification Search
CPC ................ G06T 19/20; G06T 7/2046; G06T 2207/20121; G06T 2207/30201; G06T 2207/10016
USPC ....................................................... 382/154
See application file for complete search history.

(56) References Cited

U.S. PATENT DOCUMENTS

| | | | | |
|---|---|---|---|---|
| 6,072,903 A | * | 6/2000 | Maki et al. | 382/190 |
| 6,757,571 B1 | * | 6/2004 | Toyama | 700/47 |
| 6,806,898 B1 | * | 10/2004 | Toyama et al. | 348/14.16 |
| 7,184,071 B2 | * | 2/2007 | Chellappa et al. | 348/46 |
| 8,204,301 B2 | | 6/2012 | Xiao et al. | |
| 8,243,118 B2 | * | 8/2012 | Pace | 348/14.01 |
| 2009/0141940 A1 | * | 6/2009 | Zhao et al. | 382/103 |
| 2010/0215255 A1 | | 8/2010 | Xiao et al. | |
| 2010/0284607 A1 | * | 11/2010 | Van Den Hengel et al. | 382/154 |
| 2011/0102553 A1 | | 5/2011 | Corcoran et al. | |

FOREIGN PATENT DOCUMENTS

| | | | |
|---|---|---|---|
| CN | 1926573 | | 3/2007 |
| JP | 2002216114 | | 8/2002 |
| JP | 2003044873 | | 2/2003 |
| JP | 2006244387 | | 9/2006 |
| JP | 2010072700 | | 4/2010 |
| JP | 2011097447 | | 5/2011 |
| WO | WO 2011/070023 | * | 6/2011 |

OTHER PUBLICATIONS

Baker, S. et al; The Template Update Problem; IEEE Transactions on Pattern Analysis and Machine Intelligence, IEEE Service Center, Los Alamitos, CA, US; vol. 26, No. 6; Jun. 1, 2004; pp. 810-815; XP011111532, ISSN: 0162-8828, DOI:10.1109/TPAMI.2004.77.

Papandreou, G. et al; Adaptive Multimodal Fusion by Uncertainty Compensation with Application to Audiovisual Speech Recognition; IEEE Transactions on Audio, Speech and Language Processing, IEEE Service Center, New York, NY, USA; vol. 17, No. 3, Mar. 1, 2009, pp. 423-435; XP011251200, ISSN: 1558-7916; DOI:10.1109/TASL.2008.2011515.

* cited by examiner

*Primary Examiner* — Samir Ahmed
(74) *Attorney, Agent, or Firm* — Patti & Malvone Law Group, LLC

(57) ABSTRACT

A method for constructing an image model (M1; M) from at least one image data input (IV1; IV1-IVn), comprises the steps of, in an iterative way, determining at least one state (PS1; PS1-PSn) of said at least one image data input (IV1; IV1-IVn), and a state (PSMF) of an intermediate learning model (MF; MIF)

determining a target state (TSP) from said at least one state (PS1; PS1-PSn) of said at least one image data input, and from the state (PSMF) of said intermediate learning model (MF; MIF), performing at least one transformation in accordance with the determined target state (TSP) on said at least one image data input (IV1; IV1-IVn), thereby generating at least one transformed image (IV1T; IV1T-IVnT), aggregating said at least one transformed image (IV1T; IV1T-IVnt) with intermediate learning model (MF; MIF; MIT; MFT) information, thereby generating an updated estimate of said image model (M1; M), providing said updated estimate of said image model (M1; M) as said image model (M1; M) while also providing said updated estimate of said image model (M1; M) in a feedback loop to a model object learning module (500) for deriving an update of said intermediate learning model (MF, MIF).

17 Claims, 10 Drawing Sheets

METHOD AND ARRANGEMENT FOR IMAGE MODEL CONSTRUCTION

TECHNICAL FIELD

The present invention relates to a method for image model construction.

BACKGROUND

At present, construction of a model based on real dynamic scenes or even on images taken by cheap cameras can be a difficult problem.

Dedicated hardware solutions exist but these are expensive, make use of expensive cameras and are cumbersome to use. Moreover most solutions also do not allow the scenes to be dynamic, which restricts their use significantly.

For three dimensional, which, during the remainder of the text will be abbreviated by 3D, construction from 3D measurements state-of-the art meshing algorithms can create results with good quality from quality measurements; however these solutions are computationally very intensive. Furthermore no solutions are available for the generation of 3D models with good quality based on lower quality images.

SUMMARY

It is therefore an object of embodiments of the present invention to present method and an arrangement for image model construction, which is able to generate high quality 2D and 3D image models and video scenes from lower quality real life captions, while at the same time providing a cheap and simple solution.

According to embodiments of the present invention this object is achieved by a method for constructing an image model from at least one image data input, said method comprising the steps of, in an iterative process
 determining at least one state of said at least one image data input, and a state of an intermediate learning model
 determining a target state from said at least one state of said at least one image data input, and from the state of said intermediate learning model,
 performing at least one transformation in accordance with the determined target state on said at least one image data input, thereby generating at least one transformed image,
 aggregating said at least one transformed image with intermediate learning model information, thereby generating an updated estimate of said image model,
 providing said updated estimate of said image model as said image model while also
 providing said updated estimate of said image model in a feedback loop to a model object learning module for deriving an update of said intermediate learning model.

In this way, by providing feedback of subsequent updated estimates of the model, in an iterative process, by using at least one of these previously generated updated estimate models for generating a learning model, and by making use of state parameters of both the input as well of this continuously adapted learning model, a highly accurate model will be obtained while using much less computing effort and resources compared to the present state-of-the art techniques.

In an embodiment not only a transformation is performed on some or on all of the input data, but also on the intermediate learning model. These transformations are performed in accordance with the determined target state. By further using the thus generated intermediate transformed model together with the transformed image or images during the aggregating step, a more accurate updated estimate of the image model can be obtained in an even faster way.

In another embodiment subsequent states are determined on a same image data input, wherein said aggregating step comprises a convergence check of subsequent ones of said updated estimates of said image model, such that only the last updated estimate of said image model is provided as said image model.

This is especially suited for generating accurate models on still image inputs, possibly being of low quality, using less computing resources compared to prior art methods.

In another embodiment subsequent values of a state are determined on subsequent frames of a video data input, such that subsequent updated estimates of said image model are tracking an object in said subsequent frames of said video.

This provides a solution to the problem for generating high quality models tracking objects on video.

In another embodiment said at least one image data input comprises a first image data input comprising a video sequence of an object in 2D or 2D+z format, and a second image data input comprising a full 3D image of said object, wherein said state comprises a combination of values representing position and morphing parameters of said object in 3D, such that successive updated estimates of said image model in 3D are provided as said image model.

In an embodiment such position parameters may comprise an orientation of said object in 3D, the scale of said object in 3D, the location of said object in 3D. Morphing parameters may comprise parameters representing facial features in case of a human head to be represented, or color and texture in case of a relatively static object such as a car to be represented.

This gives a first detailed example for generating high quality 3D models tracking 2D video images. This may be used in e.g. video conferencing applications where high quality 3D models will be generated tracking objects in 2D video.

In case that the second image data input comprises a full 3D image of said object having at least one different feature, the generated model can be such as to track the object of the 2D video sequence, while yet showing this different feature. In another embodiment such 3D estimates are further projected onto a 2D plane such that these 2D projections in 2D are provided as said image model to the output.

This may also be of use in video conferencing applications or in e.g. internet or on-line-meeting applications where people might desire being represented in an improved, although still realistic, way compared to real-life video input being made of them. This can for instance be the case when someone is typing information on a keyboard during such a video on-line-meeting session. This person is thus not looking straight into the camera, while he/she might nevertheless desire being represented by a life tracking model which is anyhow looking straight into the camera, as this life tracking model will be communicated to and viewed by the other participant to this on-line-meeting. These embodiments provide a simple, yet very accurate solution to this problem. A slightly corrected model is thus generated, which might be provided, either in 3D or, after a projecting step in 2D, and, depending upon the application, being further communicated or transmitted, or stored e.g. as a video sequence of the generated model.

In yet other embodiments said target state is further determined based on additional information related to an object for which said image model is to be generated.

Alternatively said intermediate learning model may also be further derived from externally provided model information.

The present invention relates as well to embodiments of an arrangement for performing this method, for image or video processing devices incorporating such an arrangement and to a computer program product comprising software adapted to perform the aforementioned or claimed method steps, when executed on a data-processing apparatus.

It is to be noticed that the term 'coupled', used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

During the whole of the text two-dimensional will be abbreviated by 2D, while, as previously mentioned, three-dimensional will be abbreviated by 3D.

BRIEF DESCRIPTION OF THE DRAWINGS

The above and other objects and features of the invention will become more apparent and the invention itself will be best understood by referring to the following description of an embodiment taken in conjunction with the accompanying drawings wherein:

FIG. 4b represents another variant to the embodiment of FIG. 4a.

DETAILED DESCRIPTION

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Figure 1A:
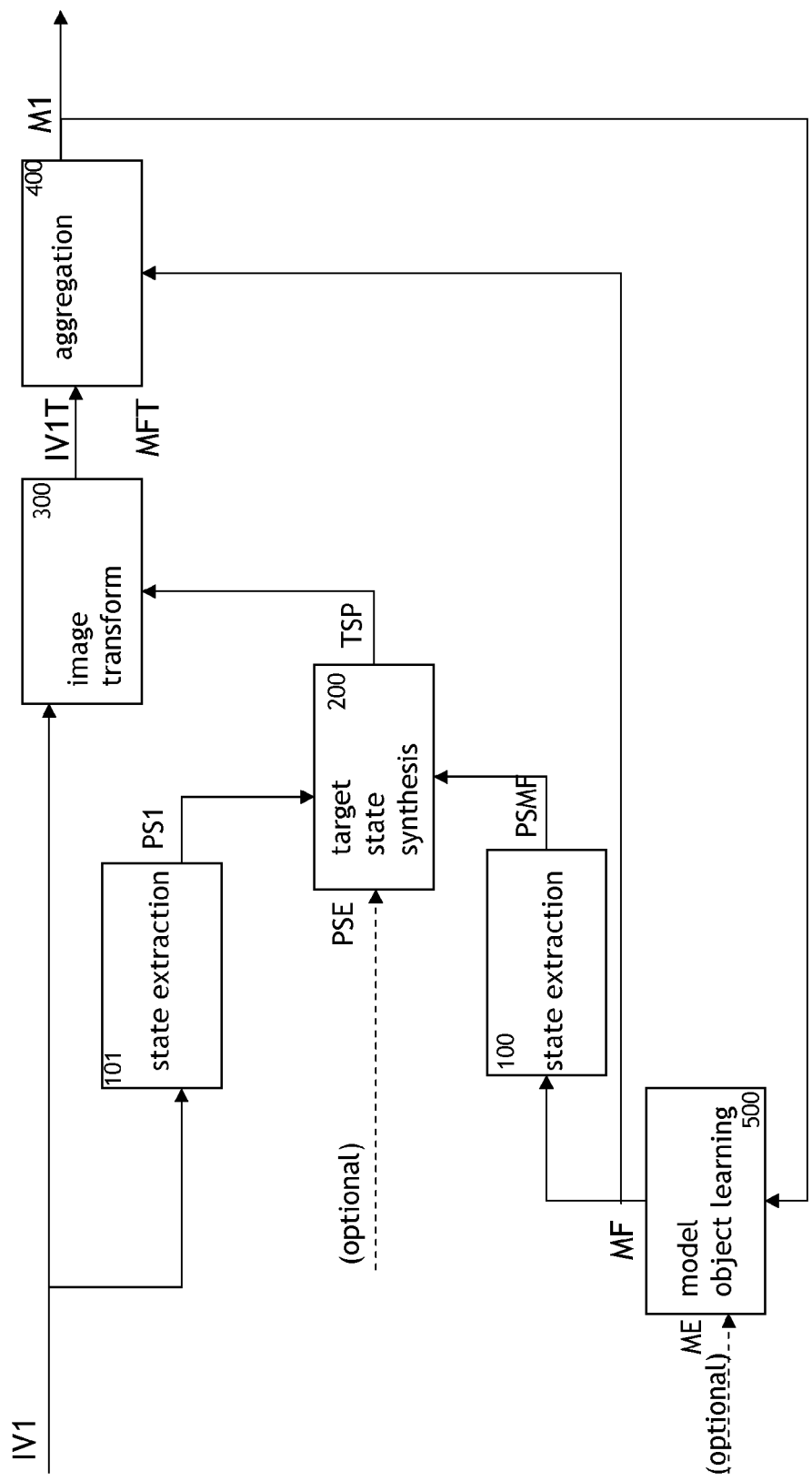
FIGS. 1a-b show schematic embodiments of a method for providing a model from a single input source of image data

FIG. 1a shows a schematic drawing of an embodiment of a method for generating and providing a 2D or 3D image model out of a single image data input. This image data input may have been provided by a camera, providing a still image or a sequence of pictures, possibly representing moving objects, in 2D, 3D or 2D+z format. With 2D+z is meant that two-dimensional pixel data are provided in conjunction with depth information. Such a representation can be used to reconstruct 3D pixel data, and is generally generated by means of 3D cameras. The image input data may as well be taken from e.g. a memory or storage device, or be provided via any type of communications network, e.g. a MMS picture sent by an ordinary mobile phone. The input image data is denoted IV1 in FIG. 1a and is subjected to two operations. A first operation concerns a state extraction or determination, with which is meant that state parameters, for representing the state of an object of the image input, are determined. With state a configuration of object features is meant, and these features are themselves represented by a set of values. These values may thus describe the possibly variable properties or features of the object. This set of values can be arranged into a vector, but other representations for such a state are of course also possible. For the example of a human head as object of which the state is to be determined, this state may be represented by a vector with values of the following characteristics or properties: (headOrientation_x, headOrientation_y, headOrientation_z, scale, location_x, location_y, location_z, faceExpression_1_x, faceExpression_1_y, . . . , faceExpression_68_x, faceExpression_68_y). HeadOrientation_x thus indicates the inclination of the head in the horizontal direction, headOrientation_y thus indicating the inclination of the head in the vertical direction and headOrientation_z thus indicating the inclination of the head in the depth direction. FaceExpression_1_x, denotes the location, in the horizontal direction, of a certain facial feature, denoted by item 1, in the image. In the aforementioned examples 68 of such features will then be represented by means of their 2D locations. Such facial features may e.g. be the left/right edges of a mouth or of an eye, etc Similarly, in case of moving images, e.g. of a racing car, the object to be represented will be this racing car, and the state of this object may be represented by a vector with values for the following characteristics: car orientation in 3D, scale and location of the car in 3D, orientation of the wheels in 3D, colour, etc.

As from the above examples, it is clear that morphing features such as these determining facial expressions, as well as e.g. color and texture, are used for identifying features relating to the appearance, whereas position parameters such as the orientation, scale and location are used for identifying a position in 3D.

Methods for determining the state of the object out of the incoming raw data will generally first involve a step of recognition of the object under consideration, possibly but not necessarily by performing segmentation operations, followed by a further in depth analysis of the thus recognized object. This further analysis may e.g. involve usage of the Active Appearance Model, abbreviated by AAM, which allows, e.g. in case of a human head as object to be modeled based on a 2D image input, the determination of the shape and appearance of facial features on a 2D input image via a fit with a 3D or 2D AAM internal shaping model. It may start with comparing the 2D input image with the starting value of a 2D AAM model, which AAM model itself is then further gradually altered to find the best fit. Once a good match is found, the parameters such as face_expression_1_x, face_expression_1_y, etc. thus determined based on this AAM adapted model are output.

Of course other methods may be used for determining the state of a recognized object, as is well known by a person skilled in the art In case the image data input comprises more than one object, the process for determining state parameters may be performed for each object for which a model is desired. This can be done in parallel or sequentially, depending on whether the input data themselves are still images or moving images, on the desired level of accuracy, and on the available computing resources. A person skilled in the art will be able to generate embodiments for providing multiple models in case the image data contains more than one objects.

The state of an object is denoted PS1 in FIG. 1a and is used as an input for a step denoted by module 200 "target state synthesis". During this step a target state TSP is determined based on one or more state inputs. In this example of FIG. 1a two state inputs are shown: the state of the input image PS1, as well as a "learning model state" PSMF. The latter concerns a value obtained from feedback of the output model. In general, such a feedback information is not yet available at start up of the method for the first image to be analyzed, such that the initial value of PSMF can be a default value in case some initial knowledge on the final model may already be known beforehand. Alternatively step 200 can just ignore this first PSMF value. In another embodiment also some external state information, denoted PSE on FIG. 1a, can be provided as an optional input, as indicated by the dashed arrow on FIG. 1a. This external information can for instance be obtained from an external speech analysis module, performed on the same input video data IV1 in case IV1 comprises such video. By providing the extra audio information which is the result from this speech analysis, to the target state determination module 200, some sophisticated methods can be used to compare the facial expressions earlier determined in PS1, with this speech information, and deduce or optimize therefrom a more refined facial state for being provided as target state TSP.

Other methods for determining the target state, denoted by TSP in FIG. 1a, out of the different input states PS1, PSMF and optionally from extra information PSE, may comprise performing a weighted combination of the various input states, with the weights reflecting the confidence of the states, which confidence levels themselves were determined during the state extraction itself. For the aforementioned example of the AAM method for determining the PS1 parameters, parameters identifying the matching result can then e.g. be selected as such confidence measures.

Another method for determining the target state may simply consist of selecting one of the input states, which option can be preferred in case a check of the result of the interpolation or weighted combination as explained in the previous example, of the different states, indicates that such interpolated result is lying outside predetermined limits. This option may also be more appropriate during the initialization phase of the method, in case PSMF only comprises a default value, or in case the difference between the input states is rather large. This may for instance occur in case PS1 indicates an orientation of the head of 180 degrees in the z-direction, which may be the case when the head is turned to the back, with a confidence of 0.2, while another state value, e.g. PSMF indicates an orientation of only 20 degrees, with a confidence of 0.6 as for instance imposed by already known information for the model. In such cases it is best to only select one of both states as target states, in stead of performing a weighted combination or interpolation. The selection itself can then just be based on selecting the state with the highest confidence level.

The target state TSP is used for performing a transformation of the input image data, which transformation is represented by step 300 "image transform". Such an image transform may take place at the pixel level in 2D or at the voxel, which is a term for indicating a 3D pixel, level in 3D. In an embodiment in 2D some filtering operations may take place such as to only keep useful pixel information with respect to the object of which a model is to be shown at the output. This object is of course the same as the one of which the state was determined. Therefore the processes of state extraction, and image transform have to be aligned and also synchronized, such that the image transform takes place after the determination of the target state.

Another example of such an image transform may involve the adjustment of facial parameters. In an example where input data in 2D are to be adapted, a method making use of triangles for representing facial features may be used. By means of interpolating distances as defined by these triangles, and attributing features to the pixels as these new positions, which were previously attributed to the pixels at their previous position, an image transform may result.

Another method for performing this transform will be given when describing the example of the embodiments of FIG. 3a-b.

In all cases, the result of this image transform operation is a transformed image denoted IV1T, which in general will contain only details of the object under consideration.

This transformed image IV1T will be aggregated with intermediate learning model information MF. Upon start up of the method this MF information can contain default information about the model, or alternatively may just be ignored. Both IV1T and MF, if available, will be aggregated into a single image in step 400, this single image comprising an estimate model of the object, and will generally be output. This image model is denoted M1.

This determined estimate model M1 is fed back to a model object learning module 500, which is adapted to derive from this estimate model an update of the learning model. As the learning model will then continuously be adapted in successive iteration steps, it is generally denoted as "intermediate learning model" MF. Deriving the update of the intermediate learning model from the estimate of the image model M1 may involve keeping track of successive estimates of the model M1, by e.g. storing them and may also involve a processing operation on the latest one or on all or a subset of all previously determined estimates of the image model, for generating an intermediate learning model MF from the latest model and previously generated outputs M1. In a first iteration step MF may be the same as M1, this model object learning step performed by the same named module 500 in this case then just comprising deriving the "intermediate learning model" MF as being the same as its first input M1. As in general several iterations may be involved, subsequent values of MF will be generated such that the intermediate learning model may continuously change, depending on the amount of iterations of feedback are used, and depending on how the estimate of the image model after the aggregation step itself may change.

The intermediate learning model MF will also undergo a state extraction step 100 for determining the state of this intermediate learning model. Similar operations as for the determination of the state of the input images may be performed in this respect, but, as the model will generally only contain data on the object under consideration, object recognition is generally no longer needed. The state of the intermediate learning model is denoted PSMF. The state parameters of the intermediate learning model are used together with the state parameters of the input image data for determining the target state TSP.

During the feedback process, thus during the intermediate learning model generation and state extraction thereof, IV1 may have changed already, especially in case of input video where a next frame may have been already presented at the input IV1. In this case this new frame of the video sequence may be further used for the state extraction step 101 as well as for the image transform. This is however not necessary, and will depend upon the embodiment. In case of a new frame presented at the input, state extraction may thus take place thereupon, so that a new state of this input image will be used together with the state of the intermediate learning model, determined based on the previous frame, for generating TSP. In case IV1 had not changed e.g. in case of a still input image, the state extraction 101 will probably yield similar results as in the previous period of this operation, but the target state synthesis will now also take into account the state extracted from the intermediate learning model. In this way a better tuning of the target state will result, which, in its turn, will further influence the image transform 300. This will generally lead to a quicker convergence. In another embodiment, such as the one presented in FIG. 1b the intermediate learning model MF will also undergo an image transformation step 301, controlled by the target state parameters. This image transformation on the intermediate learning model may be performed in a similar way as the transformation on the image input data, or possibly in a different way, depending upon the data themselves, e.g. in case the image input data are presented as 2D, and the model is a 3D model. For both transform operations however TSP is used as a control input to both processes. The result of the image transform operation on MF is denoted intermediate transformed model MFT. In this embodiment MFT is used as intermediate learning model information during the aggregation step It is evident that for a smooth operation, timing control of all these steps is of utmost importance, such that the transform of MF is not taking place before the target state TSP was determined. In the embodiment of FIG. 1a, where no transform is performed on the learning model, timing control of the aggregation step, where the transformed image data is to be aggregated with the non-transformed learned model, is of utmost importance. A person skilled in the art is however knowledgeable about techniques for realizing this, such that this will not be further discussed in this document.

Figure 1B:
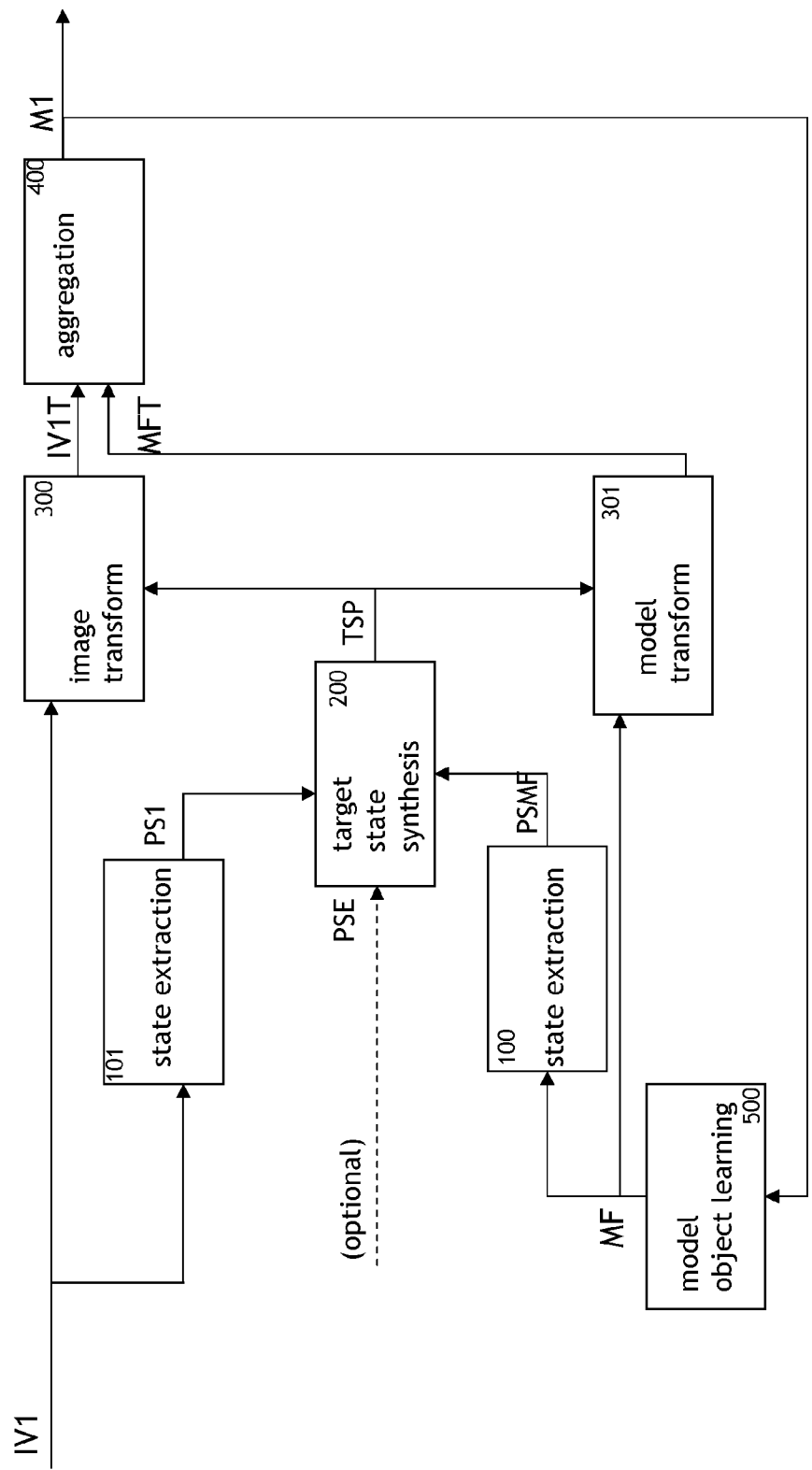

As, in the embodiment depicted in FIG. 1b, both transformed image data IV1T and MFP will be further used as input in the aggregation step 400, a better and more realistic estimate of the model will result. By further repeating the thus explained feedback procedure on subsequent updated estimates of M1, the resulting model will be further fine tuned. Subsequently updated estimates of the image model may be provided to the output in subsequent timing instances. This is of most use for input video data, where in this way the model will track movements of the to be modeled object in the input video. Alternatively, the aggregation step may itself further comprise checking e.g. convergence criteria, such that only after the model has converged towards an estimate which does not further change substantially, it will be provided to the output. It is evident that such embodiments ore better suited for still images, whereas the speed of changing images over time, as is the case with input video, may be such as to prevent several iterations taking place on one image. In other embodiments dealing with input video data, some iterations may take place on subsequently provided images or frames, before the latest update of the model may be provided to the output. In such case also a convergence test can again be applied.

Figure 1C:
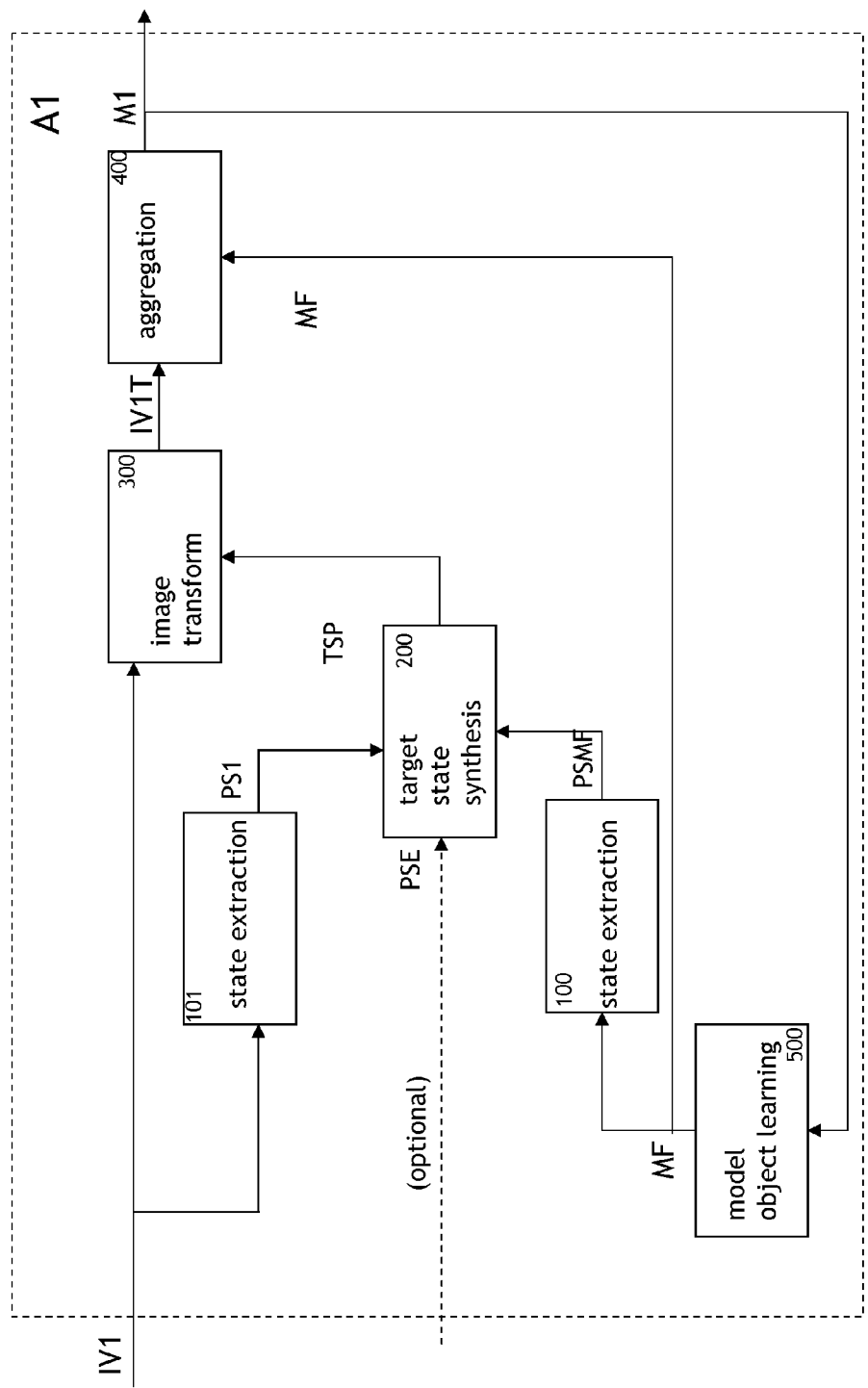
FIG. 1c shows a schematic embodiment of an arrangement A1 for providing a model from a single input source.

FIG. 1c shows an arrangement A1 for performing the steps of the method of FIG. 1a. Such an arrangement may be realized by means of a software implementation, with this software either being provided by means of executable code on a carrier, or programmable into a memory, or by means of a download operation from a server such that it can run onto a processor, or alternatively be executed on this server itself. Alternatively such an arrangement may be realized by means of hardware elements, e.g. by means of a single processor, or in a distributed way. The different steps are represented by different modules, but it is clear that such a clear structural delineation may not be present in some implementations, and that all or a subset of the steps may be performed by one single processor.

The embodiment of FIG. 1a further shows that, during the model object learning step 500 also external data with respect to this model, e.g. a previously generated model which was obtained e.g. during a previous use of the method, and which was externally stored, can now be provided as an external input. This is an optional step, which can nevertheless enhance the convergence speed.

Figure 2A:
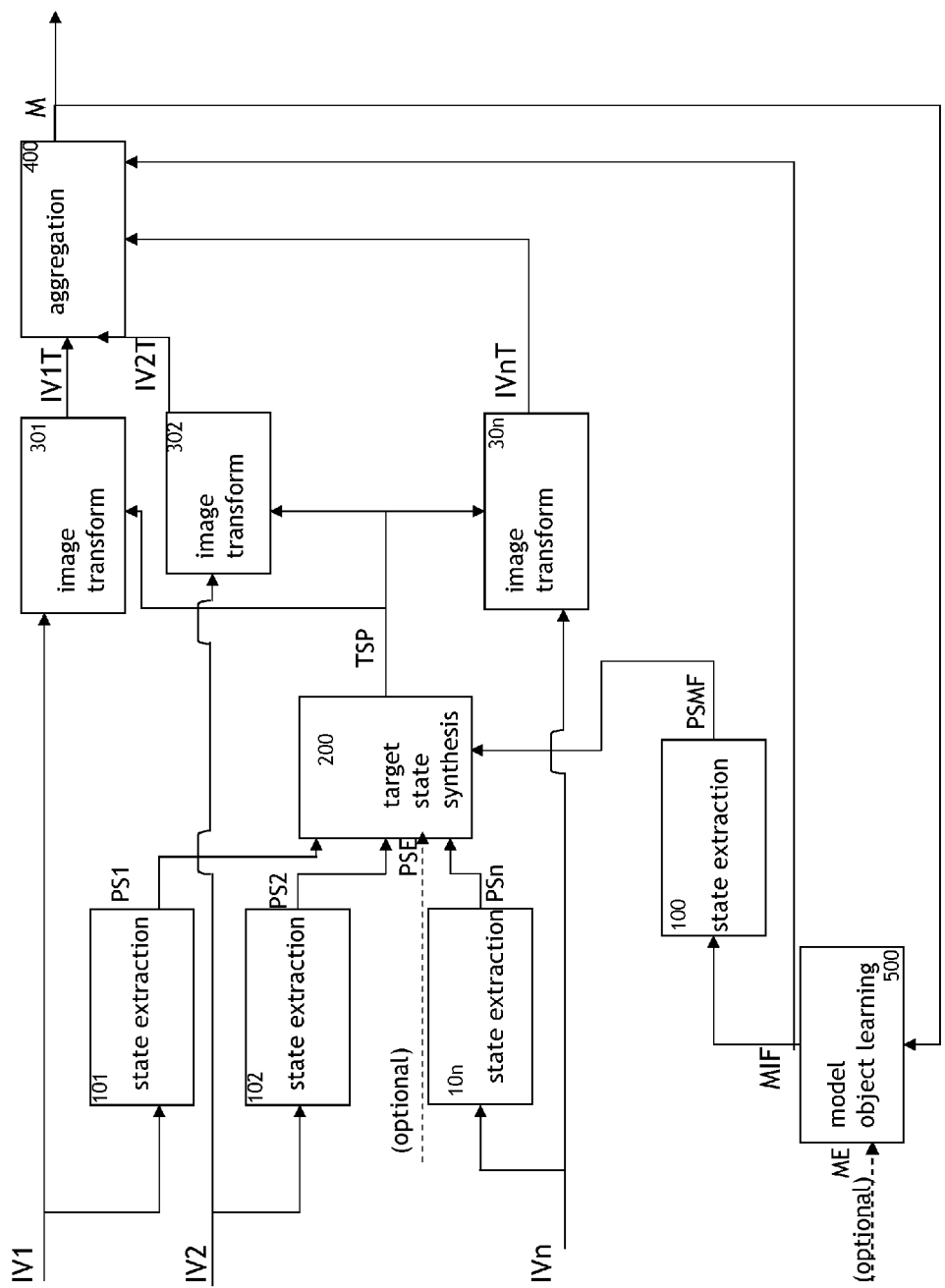
FIGS. 2a-b show schematic embodiments of a method for providing a model from multiple input sources of image data.

FIG. 2a shows another embodiment of the method, which is now using image information from various input sources. In the embodiment of FIG. 2a n different image inputs are shown which are denoted IV1, IV2 to IVn. These contain image data, e.g. image information in 2D, 3D and 2D+z, and may comprise real-life streaming data from a camera, or may comprise data provided by a memory or via a telecommunications channel from a distant computer or camera or mobile device etc.

The embodiment of FIG. 2a is similar to that of FIG. 1a, with the difference that on each image input data the state is determined relating to the object of which the model is to be represented as the output M. Therefore n state extraction steps may be performed in parallel on the n image input sources, generating n object states of the same object. It is evident that for a good operation these state extraction modules are again to be synchronized and have to be operative such as to extract parameters of the same object, of which some basic details are possibly known beforehand. Alternatively, depending on the computing resources, the n state extractions 101, 102 to 10n may be performed in a serial way e.g. by the same module. Also in this case a good timing synchronization between these and the next steps to be performed is important, and a person skilled in the art is adapted to realize implementations for taking care of the synchronization aspect. As this is not directly related to embodiments of the subject invention, we do not further discuss this aspect into further detail in this document.

If the aim is e.g. to generate a good model of a human head, all state extraction modules 101, 102 to 10n are adapted to search for a "human head-like" object and not for e.g. a car in case this should occasionally appear on the images. The resulting extracted state parameters of this object, denoted PS1, PS2 to PSn, are provided to a target state synthesis module 200, which is now adapted to determine a target state TSP. In general, the more image input sources related to the same object are used for generating a model of this object, the better this model can be constructed. However care has to be taken to exclude, or at least to pay less attention to, these values obtained in case the object was e.g. occasionally not present on the input image. The target state synthesis step 200 may be similar to the one used in the embodiment of FIG. 1a, but now taking into account more inputs. A first check on these states may be helpful to determine whether or not to consider them all, which may be performed by checking whether they all contain values lying within certain predetermined limits, or comparing them with each other. In case some values are really lying outside these limits, while the majority of the other don't, it can be appropriate to discard these e.g. in case 2 states have very deviating values compared to the n−2 other ones.

The withheld states can then be used for determining the target state via interpolation, e.g. by a weighted averaging of their values. Alternatively a check of the confidence levels may indicate to only select a state with the highest confidence, as was explained in a previous paragraph with respect to FIG. 1a.

Based on the thus determined target state TSP, the input images respectively undergo a transform, as indicated by steps 301, 302 and 30n, in a similar way as explained with respect to FIG. 1a. In some embodiments, as will be explained with reference to FIGS. 3a-b and 4a-b, some of these transforms will be minor as compared with the other ones, dependent upon whether the model itself is deviating seriously from the image data input or not. Next the transformed image data IV1T, IV2T to IVnT are aggregated in step 400. Similar to the embodiment of FIG. 1a, an initial default value of intermediate learning model MIF, may be used in this aggregation step in the initial phase, or this value can just be ignored. During the aggregation of the n transformed images and possibly of an input default value of MIF in a first period of the iterative process, a more realistic estimate of the model will probably result by the combination of state-consistent data TSP used for the transformations. In addition a metric can be used to even further refine and improve the resulting estimate of the model, especially when taking into account the reliability of a certain input image as metric during the aggregation step. For instance, for the construction of the facial features of a model of a human head, the reliability of a frontal shot image is generally but not necessarily larger than that of a side shot image. By thus relatively using more information of the frontal shot image, compared to that of the side shot during the aggregation step, a better estimate model may be obtained. Also the reliabilities determined during the state extraction can be used when judging which image to give more weight during the aggregation step.

Again, the resulting model M is fed back to a model object learning module 500, which e.g. may keep track of the successively determined estimated models over time, and which can create from them, or from the latest generated one, or from a weighted combination thereof, etc. an improved intermediate learning model MIF. Of course a lot of more implementations for generating the intermediate learning model are possible.

Figure 2B:
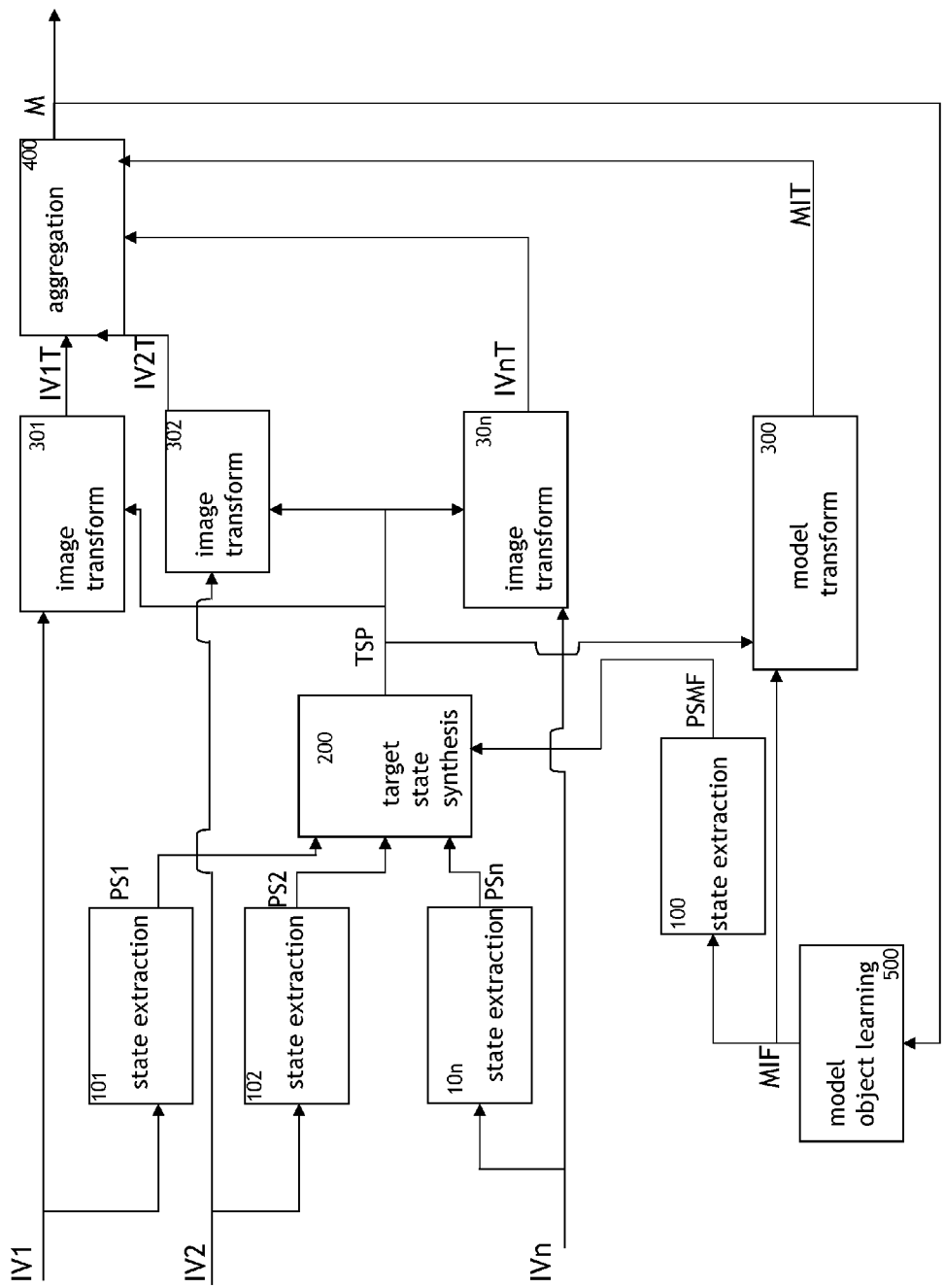

The intermediate learning model MIF will undergo a state extraction step 100, which extracted state PSMF is further used during the target state synthesis 200. The thus obtained target state parameters TSP are further used during transformation of the input images IV1 to IVn and possibly, as is shown in the embodiment of FIG. 2b, during a model transform step 300 on the intermediate learning model. The latter step will provide an intermediate transformed model MIT. By adding this intermediate transformed model to the transformed image data, a more accurate and faster convergence towards the desired output model M will be obtained.

Similar considerations as those explained with respect to FIGS. 1a-b may apply with respect to the provision of the output model, depending on the type of input image data, and depending on the available computing resources. Also similar remarks may be made with respect to state determination and the transforms of the input image data themselves, during this and possibly next iteration steps, especially in view of the changing input image data in case of video. It is again also to be mentioned that synchronization of all steps is important for guaranteeing a smooth operation. Again a person skilled in the art is able to realize this aspect of synchronization.

Figure 2C:
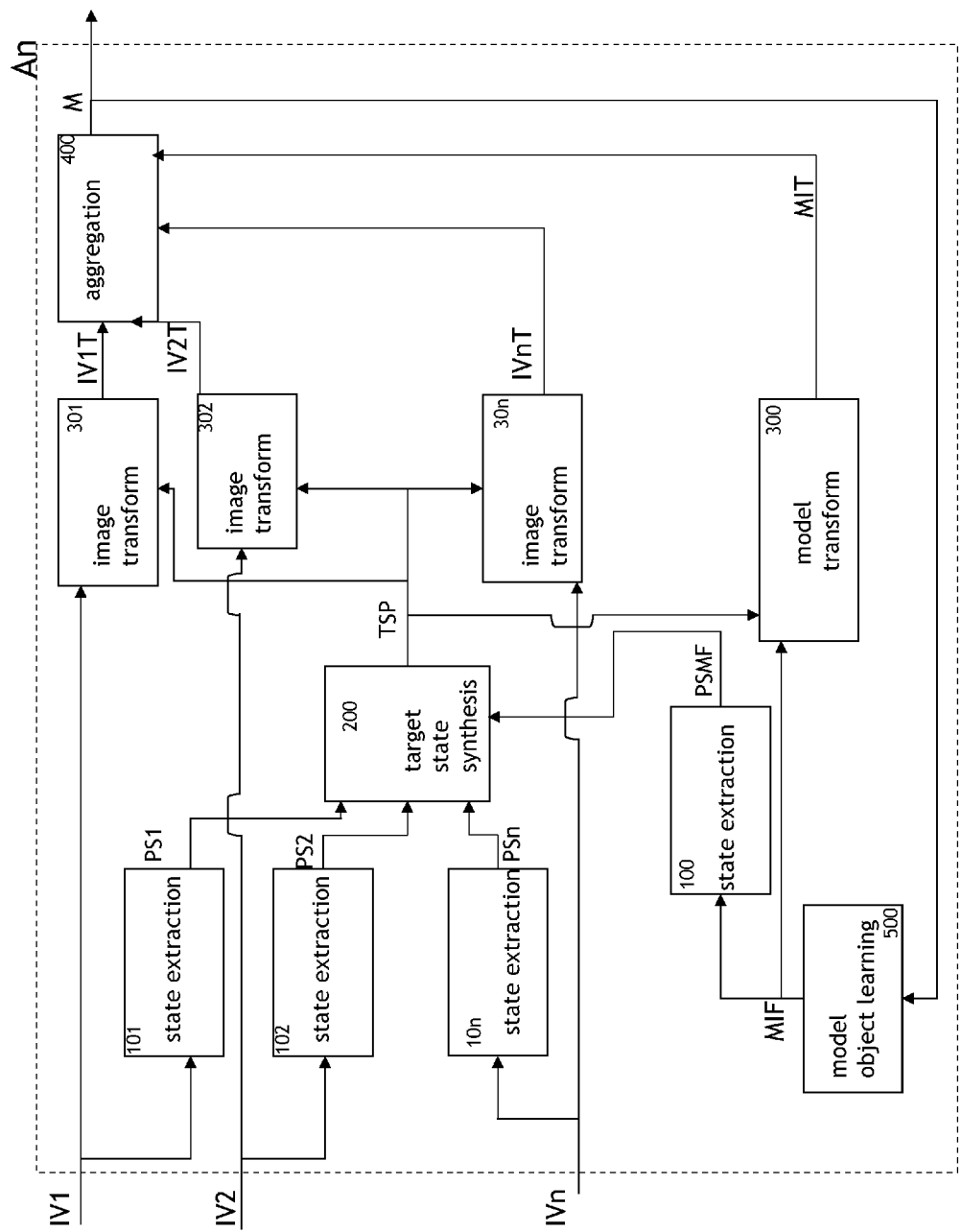
FIG. 2c shows a schematic embodiment of an arrangement An for providing a model from n input sources of image data.

FIG. 2c shows an arrangement for performing this method. Also here similar considerations apply with respect to the realization of such an arrangement, as with respect to those mentioned for FIG. 1c.

Similar to the embodiments in FIGS. 1a-c some externally provided data, e.g. a previously externally stored model obtained during a previous use of the method, can be provided to step 500, for being used during the model object learning step. It is also possible to provide external information to the target state synthesis module 200, as explained more into detail during the explanation of the embodiment of FIG. 1a.

The advantages of these methods and arrangements will even become more clear by means of further embodiments depicted in FIGS. 3a-b and 4a-b.

Figure 3A:
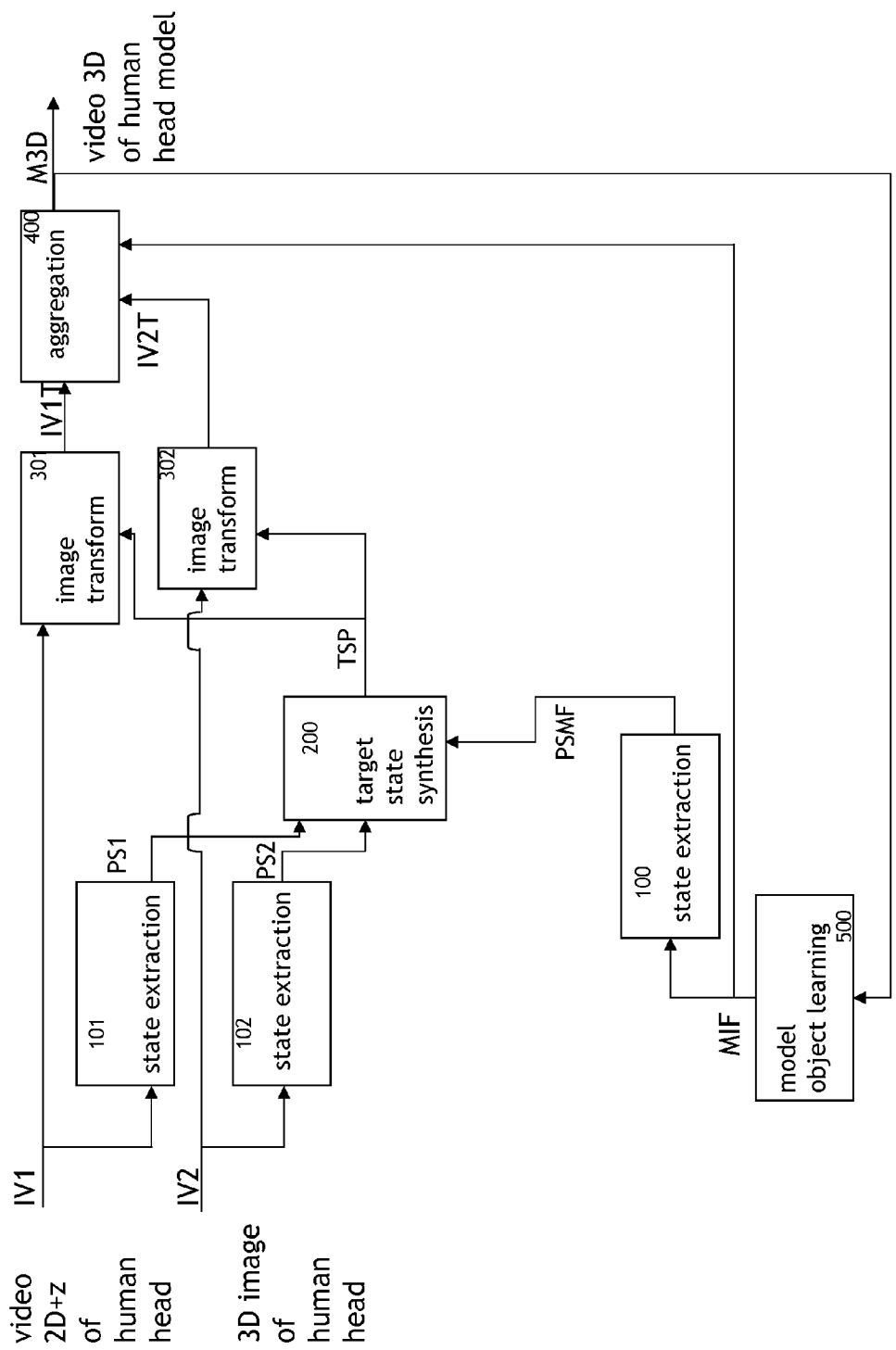
FIGS. 3a-b illustrate two other embodiments of the method, being suited for generation of a realistic 3D model almost instantaneously representing the movements and characteristics of a person, of which 2D+z information is provided as well as a single 3D image.
Figure 3B:
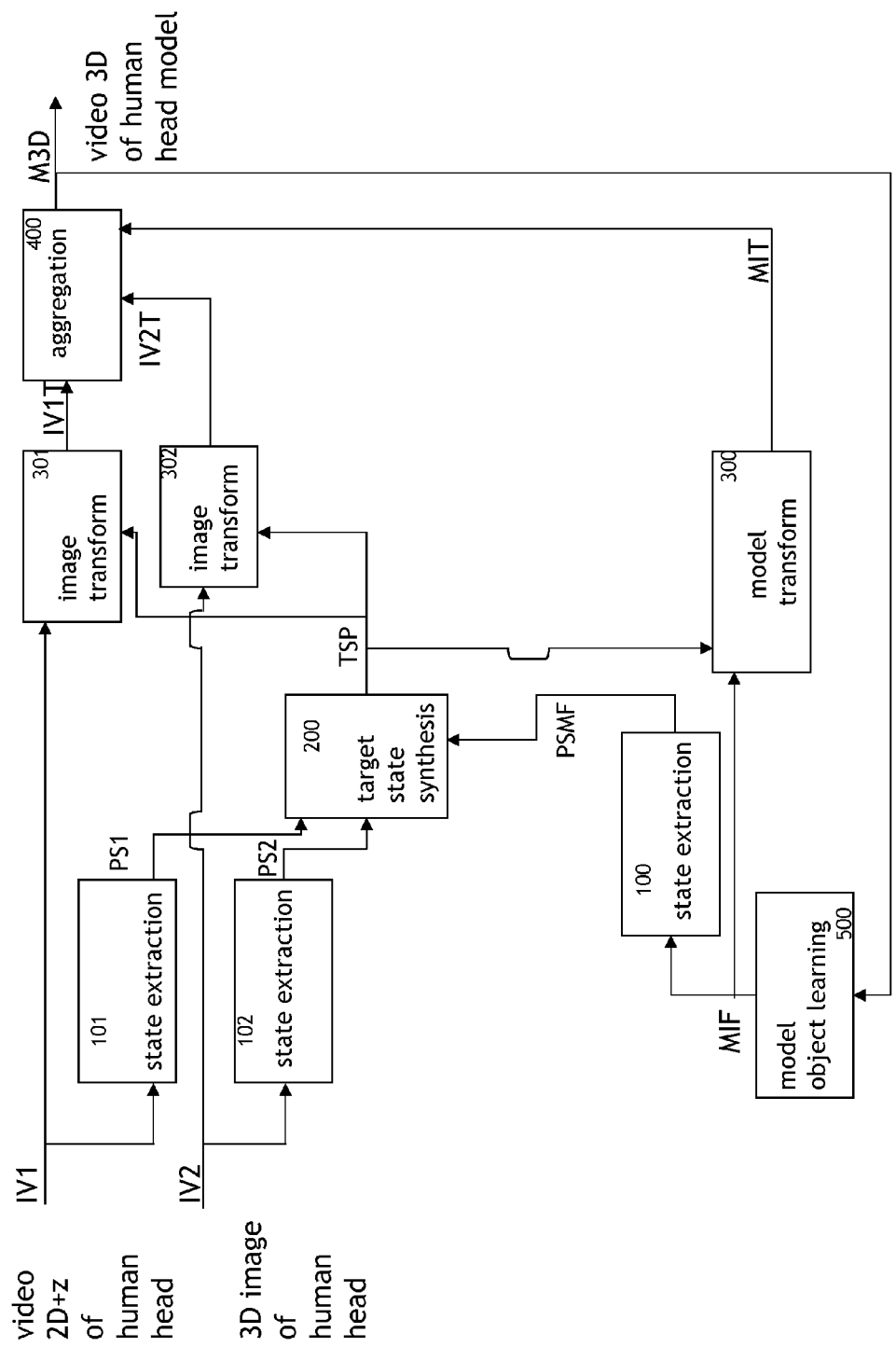

The embodiment depicted on FIG. 3a is receiving a first image data input IV1 comprising a sequence of 2D+z images of a object such as a human head, a car, a tree, . . . and a second image data input IV2 comprising a still 3D image of this same object. The image model M is a 3D model of this object and preferably has to be provided "in real time" thus meaning that movements, if any, of the object shown in the sequence of 2D+z images have to be represented and have to be as realistic, accurate as possible and in 3D.

Such a situation can e.g. occur when a user is located in front of a laptop, while a stereo camera, possibly but not necessarily being realized via a cheap combination of two webcams, is recording his/her face and upper body.

At present, even when using the best most expensive stereo camera's provided with the best stereo matching algorithms in combination with the best 3D reconstruction algorithms, it is not possible to construct the full head in 3D at a sufficiently high quality. It is beyond doubt that this will for sure be the case for 2D+z image data obtained by cheap cameras.

A second image input is now used, in this case being a 3D picture, possibly taken off-line and thus in advance of the 2D+z video sequence of this object or person. In case the object of which an accurate and "real life" model is to be generated concerns a car, a 3D picture of this car is used, etc.

For the embodiment where an accurate "real-life" representation in 3D of a 2D+z monitored person's head and face is to be provided, the state is determined as a combination of position parameters, e.g. the head orientation, scale in 3D, location in 3D and of morphing parameters e.g. these parameters related to face expressions. The latter themselves can e.g. be represented by values of e.g. 68 attributes relating to a particular relative or absolute position of the mouth, nose, eyes, jaw line, eyebrows etc. These may be expressed as their absolute or relative coordinates in 3D. For the case of a car to be modeled the state may comprise a combination of values representing position parameters and morphing parameters in 3D, with position parameters again being related to the location, scale and orientation in 3D of this car and the morphing parameters identifying color, texture, orientation of e.g. sub-objects such as wheels, etc.

The state of the 3D picture may be determined together with that of respective subsequent images of the 2D+z video, but, as the 3D picture concerns an off-line still image, this may also have been done beforehand. In that case, these state parameters may have been determined earlier, and be stored. For the online 2D+z input image data however, the images will change as e.g. a person will inevitable move from time to time, and it is the aim to track these images as close as possible, for rendering an accurate on-line 3D output representing a model of the person's head and movements as realistic as possible. Similar considerations are valid for the other example of the moving car, which will move, may change in appearance and view, position and orientation of the wheels may change etc.

The desired state of each or of a subset of the subsequent 2D+z images of a human's head can be determined by means of state of the art image processing techniques for head pose estimation and facial feature extraction. Techniques such as the previously explained AAM method may be used for determining facial features, while the head pose parameter values can be determined e.g. via a facial feature triangle matching using the Grunert algorithm.

The state of the 3D image may have been earlier determined by a user, via a manual indication of a set of facial features on several projected versions of this 3D image of this human head. Alternatively this may also be performed in a more automatic way, e.g. via recognition techniques. Both states PS1 and PS2 are provided as input for determining the target state TSP. In this case the tracking of the movements is of most importance, such that the states determined on the subsequent 2D+z images will be given a higher weight compared to the non-changing state of the 3D image. In an embodiment TSP may even just take over the values of PS1, being the state of the 2D+z images, thus discarding the PS2 values. In next iteration periods the state extracted of the generated intermediate model will also be used for the determination of the target state, but this will be further explained in a further paragraph.

Based on the target state TSP, the images are transformed. As it is the purpose to follow the movements and expressions of the 2D+z video images as close as possible, the subsequent video frames comprising individual images will therefore not be transformed significantly, only some filtering will take place. The 3D image on the other hand is to be transformed such as to adapt it more towards the changing expressions/movements of the face as present on the subsequent 2D+z images. This can be done by a combination of object rotation, translation and scaling along with the adaptation of the facial features using e.g. a "rigged 3D model" method indicating which pixels/voxels of a detected object in an input image are to be changed when trying to adapt to certain facial features which were provided as TSP input.

In addition to these image input data, there is also the feedback information of the 3D model M of the human head itself which is continuously fed back in subsequent iteration loops. The model object learning step 500 implies a logging of the different iterations or estimates of the 3D model M, which may thus change over time as a function of varying expressions and movements. Moreover the intermediate learning model MIF itself is also adapted over several feedback loops, preferentially in a spatially dependent way, meaning that, the intermediate learning model MIF will, for every considered point in 3D space be attributed a distance metric, as is generally used for sparse adaptive sampling. During every learning model operation these distance metrics are further updated, based on an exponentially declining temporal model.

The intermediate learning model MIF is also further used for state extraction, which information is also further used for determining the target state TSP in a way as explained in the previous paragraphs, thus by first determining whether or not interpolation is suited. This interpolation can e.g. appropriate in case the confidence of the PS1 data is not so high, e.g. 50%. Alternatively in case of a low confidence e.g. lower than 20% of PS1, it may even be more appropriate to only use the PSMF. In case of a relatively high confidence of the PS1 data, e.g. more than 50%, only the PS1 data can be used. Of course other criteria can be used and, in case of interpolation, the state of the IV1 input video can still be given more weight, with respect to PSMF, for the determination of the target state.

This target state TSP can be used for transforming the input image data. In the embodiment of FIG. 3*a*, there is no further transformation of the intermediate learned model, meaning that in this case the intermediate learned model MIF is "state dependent". In an alternative embodiment depicted in FIG. 3*b*, the intermediate model MIF is further transformed in accordance with TSP, by means of a further tuning taking into account TSP, so indirectly also the state of the changing input. This is denoted a "state independent model". In the embodiment of FIG. 3*a* the intermediate learned model is directly used in the aggregation step 400, while in the embodiment of FIG. 3*b*, the transformed model information MIT is used in this step. In both embodiments, the aggregation step 400 may be further based on a confidence map, which in some embodiments may be provided together with the 2D+z data, as the confidence may be the result of the stereo matching process when determining 2D+z data from stereo camera images.

A confidence map can also be constructed for the transformed 3D data IV2T. It is for instance possible that the initially high confidence of the 3D offline scanned data decreases when a significant transformation is applied to a certain part of the face.

For a confidence metric regarding the learned model MIF, one could infer the confidence from the past: if for example the previous state of the model did not comply with the new measurements for a certain pixel, one could assume there is motion in that part, and the confidence is to be degraded as well.

By combining the adapted images IV1T, IV2T with their appropriately determined confidences, with MIF or MIT, a 3D construction algorithm, e.g. the "marching cubes" algorithm, can be used for building a consistent 3D model accurately following the 2D+z movements and expressions.

The aforementioned example for providing an accurate and "real life" 3D representation of a human head, may thus be applied in e.g. video conferencing situations where a full 3D representation of a participating member is desired for being shown and transmitted to all other participants, even if only limited resources for on-line tracking of this person are available. In such situations e.g. a combination of two webcams or a webcam and a built-in camera of a mobile device such as a laptop, can be used for generating cheap 2D+z images of all participants, whereas on the other hand a realistic and accurate offline representation in 3D representation of each person may be stored beforehand, such that, during the video conference, by making use of embodiments of the method, each person may be represented in real time and in 3D.

Figure 4A:
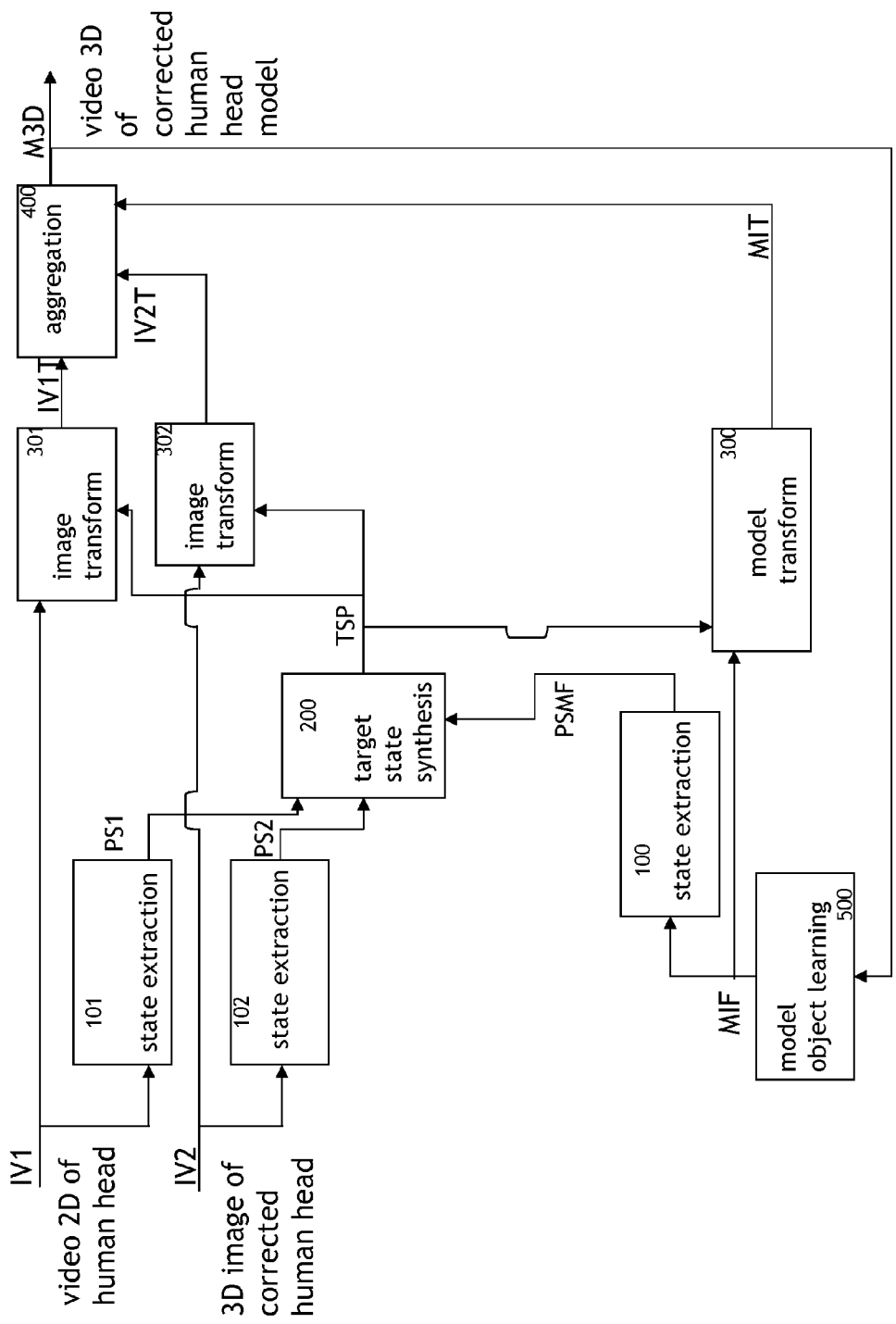
FIG. 4a illustrates a still different embodiment of the method, being suited for generation of a 3D model based on a 2D video possibly showing imperfections of a person, and based upon a single 3D image of this person.

FIG. 4*a* describes an embodiment for generating a 3D video, which may later be used e.g. via common projection techniques such as presented in FIG. 4*b* by means of step 600 denoted "P", for representing an input life 2D video from a different perspective angle, while at the same time having corrected the original real-life 2D video which could possibly contain some artifacts. This correction can be the result of projecting from a different projection point, such that in this case only a correct 3D model is to be generated for subsequent projection taking into account this different projection angle and plane. In this case the techniques as explained with respect to FIG. 3*a* can be used, followed by a projection step. The information for realizing a realistic 3D model is provided via a 3D image, of the same object, but which does not show this artifact. This can for instance be of use in the domain of on-line video communications, where a user is being filmed by e.g. a webcam and thus expected to look straight into the camera, but is instead typing on his/her keyboard. As nevertheless a view of this person with the eyes straight looking into the camera could be desired for being transmitted to the other parties of this communication, some image processing operations might be needed for generating a model of this person, realistically tracking his/her movements, but with the eyes being corrected such as to have this desired view. The phenomena of a person looking "down" is called eye-gaze; and an eye-gaze correction is therefore desired.

Previous methods to perform such an eye-gaze correction involved a multi-camera setup around the screen and an algorithm for doing view interpolation of the required camera position. The embodiments of FIGS. 4a-b on the other hand are very simple, and only require a 3D image, possibly taken off-line, of the correct view, thus with the participant looking straight into the camera.

As explained with respect of the previous example of FIG. 3a, the state is again defined as the combination of position and morphing parameters, more in particular, as it concerns again a human head, the face rotation, the scale, the location in 3D and the facial expressions. The state of the real-time 2D video will be used as the target state, and the offline scanned 3D measurements are transformed taking into account this target state. In the aggregation step the 3D geometry of the offline 3D image is used together with the texture information provided by the real-time captured 2D information A 3D model, in FIGS. 4a-b denoted M3D, is generated, and fed back in an iteration loop. In the embodiment of FIG. 4a this 3D model is provided to the output, while in FIG. 4b an additional projection step takes place such that a 2D projection of the generated model is provided to the output. In both embodiments model transforms are performed, but other embodiments exist without this step 300, as explained with respect to FIG. 3a.

In all these embodiments, the target state may be determined in an analogous way as in the embodiment of FIG. 3a, such that the 3D model is tracking the movements and face expressions of the 2D video images. By simply projecting the thus realized 3D model of the obtained human head to a different projection plan, eye-gaze correction can then already be obtained. In this respect an embodiment similar to that of FIG. 3a, with the addition of an extra projection step 600, while only receiving 2D video instead of 2D+z, can already be sufficient.

In an alternative way the 3D model will not merely follow the expressions and movements of the input 2D video, but will also take into account the improved looking position as provided by the 3D image. In this way the TSP needs to get this input from PS2, such that a different way for calculating TSP will be used, as compared to the embodiments of FIGS. 3a-b. TSP will be taken into account during the image transform step 301 of IV1, such that IV1 is transformed for already trying to have the desired features, in this case being the different look of the person, being corrected, whereas IV2 is also transformed based on TSP, such as to follow changing expressions of IV1, but still preserving the corrected feature. A possible way for implementing this is by using a "rigged" 3D model, as previously explained, thus indicating which pixels/voxels of a detected object in an input image are to be changed when trying to adapt to certain facial features which were provided as TSP input.

The learning model itself may also be transformed in a model transform step, 300, based on this "rigged model" such that the changing information from the IV1 data is used for adapting the intermediate learning model.

In all embodiments, the respective transformed images are aggregated with either the latest generated model, or the latest transformed model. In an embodiment the texture information of IV1T is merged with the texture information of IV2T and MIF or MIT. This can be realized by means of the so-called "alpha blending" techniques, where pixels of IV1T will be attributed more weight compared to these of the voxels of IV2T and MIT. With respect to the geometry the well-known Poisson surface construction technique may be used for generating a mesh.

Figure 4B:
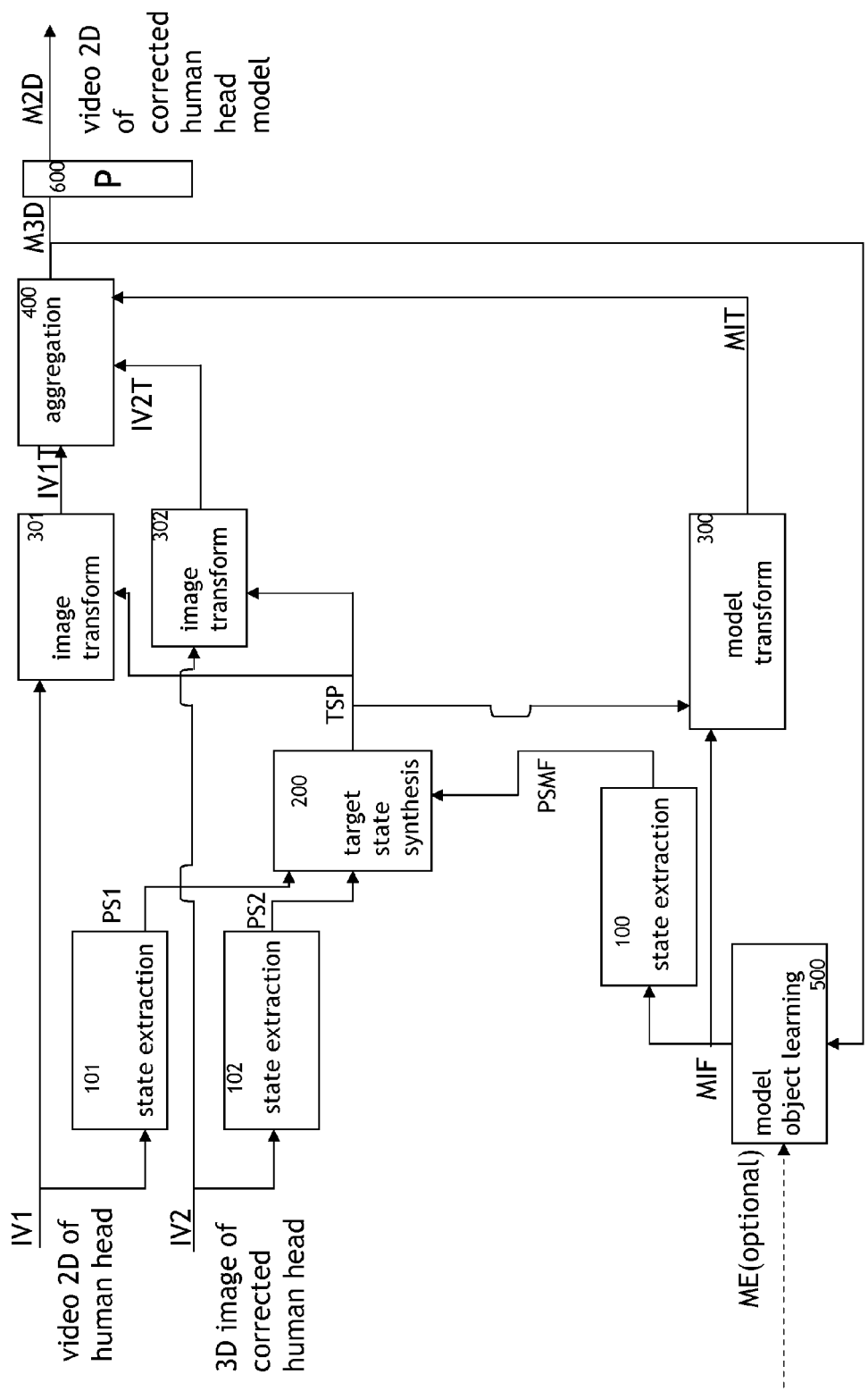

The embodiment of FIG. 4b also shows an optional input of an external model information ME, to the model object learning step 500. This external information may be provided e.g. from an embodiment as the one of FIG. 3a, and can be used as a starting value during the first initial steps of the method, such that in this case an initial value of MIF can already be provided to the state extraction step, and be used for a model transform. In a still other embodiment, where this model transform operation 300 is not present, this initial information ME, can be used as MIF for directly being provided and used during the aggregation step 400.

While the principles of the invention have been described above in connection with specific apparatus, it is to be clearly understood that this description is made only by way of example and not as a limitation on the scope of the invention, as defined in the appended claims. In the claims hereof any element expressed as a means for performing a specified function is intended to encompass any way of performing that function. This may include, for example, a combination of electrical or mechanical elements which performs that function or software in any form, including, therefore, firmware, microcode or the like, combined with appropriate circuitry for executing that software to perform the function, as well as mechanical elements coupled to software controlled circuitry, if any. The invention as defined by such claims resides in the fact that the functionalities provided by the various recited means are combined and brought together in the manner which the claims call for, and unless otherwise specifically so defined, any physical structure is of little or no importance to the novelty of the claimed invention. Applicant thus regards any means which can provide those functionalities as equivalent as those shown herein.

The invention claimed is:

1. A method for constructing an image model of an object from at least one image data input, the method comprising the steps of:

extracting at least one state comprising a configuration of object features, the features being represented by a set of values of the at least one image data input, and a state comprising a configuration of object features, the features being represented by a set of values of an intermediate learning model;

determining a target state by performing a weighted combination of the at least one state of the at least one image data input, and of the state of the intermediate learning model, with the weights reflecting confidences of the states, the confidences being determined during the state extraction;

performing at least one image transformation by using the determined target state on the at least one image data input, thereby generating at least one transformed image;

aggregating the at least one transformed image with intermediate learning model information into a single two-dimensional or three-dimensional image, thereby generating an updated estimate of the image model;

providing the updated estimate of the image model as the image model to an output while also providing the updated estimate of the image model in a feedback loop to a model object learning module for deriving an update of the intermediate learning model; and repeating the previous steps in an iterative process.

2. The method of claim 1, wherein the at least one image data input comprises:
  a first image data input comprising a video sequence of an object; and
  a second image data input comprising a 3D image of the object, wherein at least one state of the second image data input comprises values representing position and morphing parameters of the object in 3D, such that successive updated estimates of the image model in 3D are provided as the image model.

3. The method of claim 2, wherein the 3D image of the object shows the object with at least one different feature with respect to the video sequence images of the object, and wherein the image model in 3D of the object shows the at least one different feature.

4. The method of claim 2 further comprising the step of:
  projecting the updated estimates of the image model in 3D onto a 2D plane to generate a projected updated image model, wherein the projected updated image model is provided as the image model.

5. The method of claim 1, wherein the target state is further determined based on additional information related to an object for which the image model is to be generated.

6. The method of claim 1, wherein the intermediate learning model is further derived from externally provided model information.

7. The method of claim 1, further comprising the step of:
  performing a transformation on the intermediate learning model using the determined target state to generate an intermediate transformed model, wherein during the aggregating step the intermediate transformed model is aggregated with the at least one transformed image to generate the updated estimate of the image model.

8. The method of claim 7, wherein the at least one image data input comprises:
  a first image data input comprising a video sequence of an object in 2D or 2D+z format; and
  a second image data input comprising a 3D image of the object, wherein at least one state of the second image data input comprises a combination of values representing position and morphing parameters of the object in 3D, such that successive updated estimates of the image model in 3D are provided as the image model.

9. The method of claim 8, wherein the 3D image of the object shows the object with at least one different feature with respect to the video sequence images of the object, and wherein the image model in 3D of the object shows the at least one different feature.

10. The method of claim 8 further comprising the step of:
  projecting the updated estimates of the 3D image model onto a 2D plane, and providing the projections in 2D of the updated estimates as the image model.

11. An apparatus for constructing an image model of an object from at least one image data input, comprising one or more processors configured to:
  extract at least one state comprising a configuration of object features, the features being represented by a set of values of the at least one image data input provided to at least one input of the apparatus, and of an intermediate learning model;
  determine a target state by performing a weighted combination of the at least one state of the at least one image data input, and of the state of the intermediate learning model, with the weights reflecting confidences of the states, the confidences being determined during the state extraction;
  perform at least one image transformation by using the determined target state on the at least one image data input, thereby generating at least one transformed image;
  aggregate the at least one transformed image with intermediate learning model information into a single two-dimensional or three-dimensional image, thereby generating an updated estimate of the image model;
  provide the updated estimate of the image model as the image model to an output of the apparatus; and to
  provide the updated estimate of the image model in a feedback loop to a model object learning module of the apparatus, the model object learning module being adapted to derive from the update estimate of the image model an update of the intermediate learning model; and
  such that the two-dimensional or three-dimensional image model is generated in an iterative process.

12. The apparatus of claim 11, wherein the at least one image data input comprises:
  a first image data input comprising a video sequence of an object; and
  a second image data input comprising a 3D image of the object, wherein at least one state of the second image data input comprises values representing position and morphing parameters of the object in 3D, such that successive updated estimates of the image model in 3D are provided as the image model.

13. The apparatus of claim 11, wherein the target state is further determined based on additional information related to an object for which the image model is to be generated.

14. The apparatus of claim 11, further being adapted to perform a transformation on the intermediate learning model using the determined target state to generate an intermediate transformed model, wherein the at least one transformed image is aggregated with the at least one transformed image to generate the updated estimate of the image model.

15. The apparatus of claim 14, wherein the at least one image data input comprises:
  a first image data input comprising a video sequence of an object in 2D or 2D+z format; and
  a second image data input comprising a 3D image of the object, wherein at least one state of the second image data input comprises a combination of values representing position and morphing parameters of the object in 3D, the apparatus being adapted to generate successive updated estimates of the image model in 3D as the image model.

16. A non-transitory computer readable medium encoding a machine-executable program of instructions to perform steps, comprising:
  extracting at least one state comprising a configuration of object features, the features being represented by a set of values of the at least one image data input, and a state comprising a configuration of object features, the features being represented by a set of values of an intermediate learning model;
  determining a target state by performing a weighted combination of the at least one state of the at least one image data input, and of the state of the intermediate learning model, with the weights reflecting confidences of the states, the confidences being determined during the state extraction;

performing at least one image transformation by using the determined target state on the at least one image data input, thereby generating at least one transformed image;

aggregating the at least one transformed image with intermediate learning model information into a single two-dimensional or three-dimensional image, thereby generating an updated estimate of the image model;

providing the updated estimate of the image model as the image model to an output while also providing the updated estimate of the image model in a feedback loop to a model object learning module for deriving an update of the intermediate learning model; and repeating the previous steps in an iterative process.

17. The non-transitory computer readable medium of claim 16, further comprising the step of:

performing a transformation on the intermediate learning model using the determined target state to generate an intermediate transformed model, wherein during the aggregating step the intermediate transformed model is aggregated with the at least one transformed image to generate the updated estimate of the image model.

* * * * *